(12) United States Patent
Richards (10) Patent No.: US 12,297,683 B2
(45) Date of Patent: May 13, 2025

(54) EXTENDED COVERAGE FOR A SENSOR ALONG A COMPLEX CONTOUR

(71) Applicant: TOYOTA MOTOR ENGINEERING & MANUFACTURING NORTH AMERICA, INC., Plano, TX (US)

(72) Inventor: Frank A. Richards, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 512 days.

(21) Appl. No.: 16/566,693

(22) Filed: Sep. 10, 2019

(65) Prior Publication Data
US 2021/0071464 A1 Mar. 11, 2021

(51) Int. Cl.
*E05F 15/48* (2015.01)
*E05F 15/75* (2015.01)
*B60R 16/03* (2006.01)

(52) U.S. Cl.
CPC ............ *E05F 15/48* (2015.01); *E05F 15/75* (2015.01); *B60R 16/03* (2013.01); *E05Y 2900/531* (2013.01)

(58) Field of Classification Search
CPC ............ E05F 15/44; E05F 15/48; E05F 15/75
See application file for complete search history.

(56) References Cited

U.S. PATENT DOCUMENTS

| | | | | |
|---|---|---|---|---|
| 4,143,367 | A * | 3/1979 | Schestag | F16P 3/12 160/133 |
| 5,592,060 | A | 1/1997 | Racine et al. | |
| 5,880,421 | A | 3/1999 | Tsuge et al. | |
| 6,223,467 | B1 * | 5/2001 | Mahalek | E05F 15/443 49/27 |
| 6,297,605 | B1 * | 10/2001 | Butler | E05F 15/44 200/61.43 |
| 6,431,638 | B1 | 8/2002 | Mrozowski et al. | |
| 8,336,255 | B2 | 12/2012 | Shimizu et al. | |
| 8,752,332 | B2 | 6/2014 | Thiele et al. | |
| 10,017,977 | B2 | 7/2018 | Newman et al. | |
| 2005/0073852 | A1 * | 4/2005 | Ward | B60Q 1/305 362/501 |

(Continued)

FOREIGN PATENT DOCUMENTS

DE 100 47 085 * 4/2002

*Primary Examiner* — Gregory J Strimbu
(74) *Attorney, Agent, or Firm* — HAYNES AND BOONE, LLP (57) ABSTRACT

Apparatuses and methods for controlling an operation of a powered system by extending the coverage of a sensor along a complex contour. An apparatus comprises a structure and a safety system that includes a sensor, a hinge, and a contoured panel. The structure (e.g., a vehicle door) has a first edge in which at least a portion of the first edge has a complex contour. The sensor is attached to the structure. The hinge is attached to at least one of the sensor or the structure. The contoured panel is movably attached to the hinge and has a second edge that substantially aligns with the complex contour of the first edge of the structure. The safety system may be used to control operation of the structure based on a detection of an obstruction by the sensor of the safety system.

15 Claims, 7 Drawing Sheets

(56) References Cited

U.S. PATENT DOCUMENTS

| | | | |
|---|---|---|---|
| 2008/0236044 A1* | 10/2008 | Kraus | E05F 15/42 49/26 |
| 2009/0009325 A1* | 1/2009 | Hoshina | E05F 15/42 361/600 |
| 2020/0109590 A1* | 4/2020 | Okuma | E05F 15/44 |

* cited by examiner

EXTENDED COVERAGE FOR A SENSOR ALONG A COMPLEX CONTOUR

FIELD

The present disclosure generally relates to operation of a sensor positioned along a structure such as a vehicle door and, more particularly, to apparatuses, systems, and methods for extending the coverage of such a sensor to a portion of an edge of the structure having a complex contour.

BACKGROUND

Certain types of sensors are used to detect the presence of an obstruction between two objects. In some cases, these sensors are referred to as anti-pinch sensors. These types of sensors are oftentimes used in vehicle safety systems. Anti-pinch sensors are also used with vehicle doors such as, for example, powered rear doors or power sliding doors. For example, a vehicle that has a power door may include a safety system that uses an anti-pinch sensor to detect the presence of an obstruction in the path of the door when the door is being closed. This type of anti-pinch sensor helps detect, for example, when a passenger's hand or finger is in the path of a door to help prevent injury to the passenger.

Typically, the anti-pinch sensor used with a vehicle door takes the form of a sensing wire that is attached to the vehicle door at or near an edge of the vehicle door. But routing such a sensing wire along the edge of a vehicle door when that edge is complexly contoured may be more difficult than desired. For example, routing a sensing wire at or near a complexly contoured edge may violate wire routing requirements, sensor specifications, other types of safety requirements, or a combination thereof. As one specific example, routing a sensing wire along a complexly contoured edge such that the sensing wire follows the complex contour of the edge may create wrinkles in the sensing wire that violate sensing wire routing requirements. On the other hand, routing the sensing wire too spaced apart from the complexly contoured edge reduces the area of the vehicle door protected by the anti-pinch safety feature. Thus, it may be desirable to have apparatuses, systems, and methods that take into account the above-described issues.

SUMMARY

In one example embodiment, an apparatus comprises a structure, a sensor, a hinge, and a contoured panel. The structure has a first edge in which at least a portion of the first edge has a complex contour. The sensor is attached to the structure. The hinge is attached to at least one of the sensor or the structure. The contoured panel is movably attached to the hinge and has a second edge that substantially aligns with the complex contour of the first edge of the structure.

In another example embodiment, a vehicle door comprises a door panel, a sensor, a hinge, and a contoured panel. The door panel has a first edge in which at least a portion of the first edge has a complex contour. The sensor is attached to the door panel and comprises a sensing wire that runs substantially aligned with the first edge of the door panel except for the portion of the first edge having the complex contour. The hinge is attached to at least one of the sensor or the door panel. The contoured panel is movably attached to the hinge. The contoured panel has a second edge that substantially aligns with the complex contour of the first edge of the door panel. When a first load is applied to the contoured panel, the contoured panel transfers the first load to the sensor as a second load, which thereby results in a detection of an obstruction.

In still another example embodiment, a method for controlling an operation of a structure is provided. A contoured panel is moved relative to a hinge and towards a structure in response to a first load being applied to the contoured panel. The structure has a first edge in which at least a portion of the first edge has a complex contour. The contoured panel has a second edge that substantially aligns with the complex contour of the first edge of the structure. The first load applied to the contoured panel is transferred as a second load to a sensor. An obstruction is detected in response to the second load being applied to the sensor. Operation of the structure is controlled in response to the detection of the obstruction.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals, letters, or both in the various examples. This repetition is for the purpose of simplicity and clarity and does not in itself dictate a relationship between the various embodiments and/or configurations discussed.

DETAILED DESCRIPTION

Illustrative embodiments and related methods of the present disclosure are described below as they might be employed in one or more methods and systems for use in controlling the operation of a structure using a sensor and extending the coverage of the sensor to the portion of the structure having a complex contoured edge. In the interest of clarity, not all features of an actual implementation or method are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methods of the disclosure will become apparent from consideration of the following description and drawings.

The example embodiments detailed below describe apparatuses, systems, and methods for controlling operation of a structure by, for example, controlling operation of a powered system that operates the structure. The structure may be, for example, a vehicle door. The powered system may be used to operate opening and closing of the vehicle door. A safety system that includes a sensor may be connected to or otherwise in communication with the powered system and used to ensure that the vehicle door is not closed when an obstruction (e.g., a person's hand or finger, a box, a grocery bag, etc.) is in the path of closure for the vehicle door. In these example embodiments, the sensor is used to detect the presence of an obstruction at or near the edge of the vehicle door and then control operation of the powered system in response to the detection. This type of sensor may be referred to as an anti-pinch sensor or, in some cases, a touch sensor.

The example embodiments describe apparatuses, systems, and methods for extending the coverage of the sensor to the portion of the structure (e.g., vehicle door) having a complex contoured edge to enable improved control of the operation of the structure at the complex contoured edge. In one or more example embodiments, a hinged panel device is used to extend the coverage of a sensor to the portion of the edge of the structure having a complex contour without requiring that the sensor be physically manipulated in a manner that violates wire routing requirements, sensor specifications, or both. For example, the hinged panel device is used to transfer loads applied via an obstruction to the sensor.

In one example embodiment, an apparatus comprises a structure, a sensor, a hinge, and a contoured panel. The structure has a first edge in which at least a portion of the first edge has a complex contour. The sensor is attached to the structure. The hinge is attached to at least one of the sensor or the structure. The contoured panel is movably attached to the hinge and has a second edge that substantially aligns with the complex contour of the first edge of the structure. Together, the contoured panel and the hinge form a hinged panel device that extends the coverage of the sensor to the portion of the edge having the complex contour. With the hinged panel device, the sensor is able to detect an obstruction via a load being applied to the contoured panel.

For example, when a first load is applied to the contoured panel, the contoured panel is moved relative to the hinge and towards the structure. This movement enables the contoured panel to transfer the first load to the sensor as a second load. In response to the second load being applied to the sensor, the sensor detects an obstruction. Operation of the structure is controlled based on this detection of the obstruction. For example, operation of a powered system that operates the structure may be controlled based on this detection.

Figure 1:
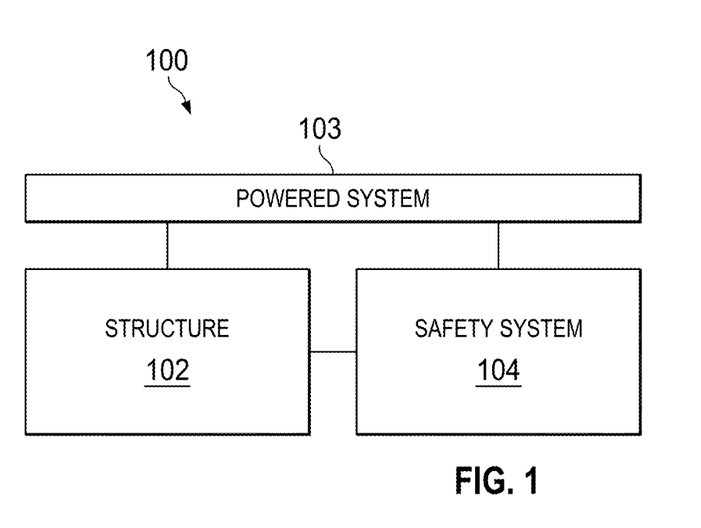
FIG. 1 is an illustration of a system in accordance with one or more example embodiments.

Referring now to the figures, FIG. 1 is an illustration of a system 100 in accordance with one or more example embodiments. System 100 includes structure 102, powered system 103, and safety system 104. Safety system 104 includes a sensor and a hinged panel device. The hinged panel device includes a hinge and a contoured panel.

Structure 102 may take different forms. In one or more example embodiments, structure 102 takes the form of a vehicle door. The vehicle door may be a rear door, a sliding door, a side door, a tailgate door (e.g., a truck tailgate), or some other type of door. The vehicle door has an exterior side and an interior side. Safety system 104 is located at the interior side of the vehicle door in these example embodiments.

Structure 102 has an edge with at least a portion of the edge having a complex contour. The complex contour may be a curved contour. In some cases, the complex contour may be a curve that has a sharp or tight radius of curvature. In other cases, the complex contour includes multiple curves with different radii of curvature. The complex contour may be a contour that deviates from a simpler contour of a rest of the edge of structure 102.

Powered system 103 may be any powered system that controls an operation involving structure 102 or that operates structure 102. For example, powered system 103 may be used to perform electric, motorized operations, automated operations, or both. In one or more example embodiments, powered system 103 includes a movement system. The movement system is used to move structure 102. For example, when structure 102 takes the form of the vehicle door, the movement system may be used to open (fully or partially) and close the vehicle door.

Safety system 104 is connected to or otherwise in communication with powered system 103. In some example embodiments, the sensor of safety system 104 is directly connected to powered system 103. Safety system 104 is used to control at least one type of operation of power system 103. For example, safety system 104 may be used to prevent powered system 103 from performing an action, cause powered system 103 to perform an action, or both.

In one example embodiment, when powered system 103 includes the movement system, safety system 104 is used to prevent powered system 103 from moving structure 102 in a particular direction. For example, when structure 102 takes the form of the vehicle door, safety system 104 may be used to prevent the closure of the vehicle door by the movement system of the powered system when an obstruction is present in the path of the vehicle door or when the obstruction is in contact with the edge of the vehicle door. Safety system 104 may simply stop the vehicle door from closing any further, may cause the vehicle door to fully open, partially open, or both.

The sensor of safety system 104 is attached to structure 102. And the hinged panel device of safety system 104 is attached to at least one of the sensor or structure 102. For example, the hinge of the hinged panel device may be attached to at least one of the sensor or the structure 102. The hinge of the hinged panel device may be comprised of a soft material, a flexible material, a rigid material, a compressible material, or a combination thereof.

The contoured panel of the hinged panel device is movably attached to the hinge of the hinged panel device. In one or more example embodiments, the contoured panel may be movably attached to the hinge by being rotatably attached to the hinge. In other words, the contoured panel may be capable of rotating about the hinge In other example embodiments, at least a portion of the hinge is comprised of a soft or compressible material. This compressible material may comprise, for example, without limitation, ethylene propylene diene monomer (EPDM), thermoplastic olefin (TPO), an injection moldable polymer, some other type of elastomer or rubber, or a combination thereof. In these examples, movement of the contoured panel may cause compression of at least a portion of the hinge (e.g., a "squishing" of the hinge) such that the contoured panel is considered movable relative to the hinge. In some cases, this type of hinge may be referred to as a "living hinge."

The contoured panel of the hinged panel device of the safety system has an edge. The edge of the contoured panel is formed such that the edge substantially aligns with the complex contour of the edge of structure 102. For example, the edge of the contoured panel may have the same complex contour as the edge of structure 102 or may closely follow the complex contour of the edge of structure 102.

The application a first load to the contoured panel of the hinged panel device causes movement of the contoured panel relative to the hinge of the hinged panel device. In particular, the contoured panel may be moved in a direction towards the sensor of safety system 104. When the first load meets at least a first threshold, the first load is transferred to the sensor as a second load. When the sensor detects (actively or passively) that the second load meets at least a second threshold, this detection triggers a response by powered system 103. For example, when the second load meets the second threshold, powered system 103 responds by performing a selected action, stopping the performance of an ongoing action, preventing an action from occurring, or a combination thereof.

Figure 2:
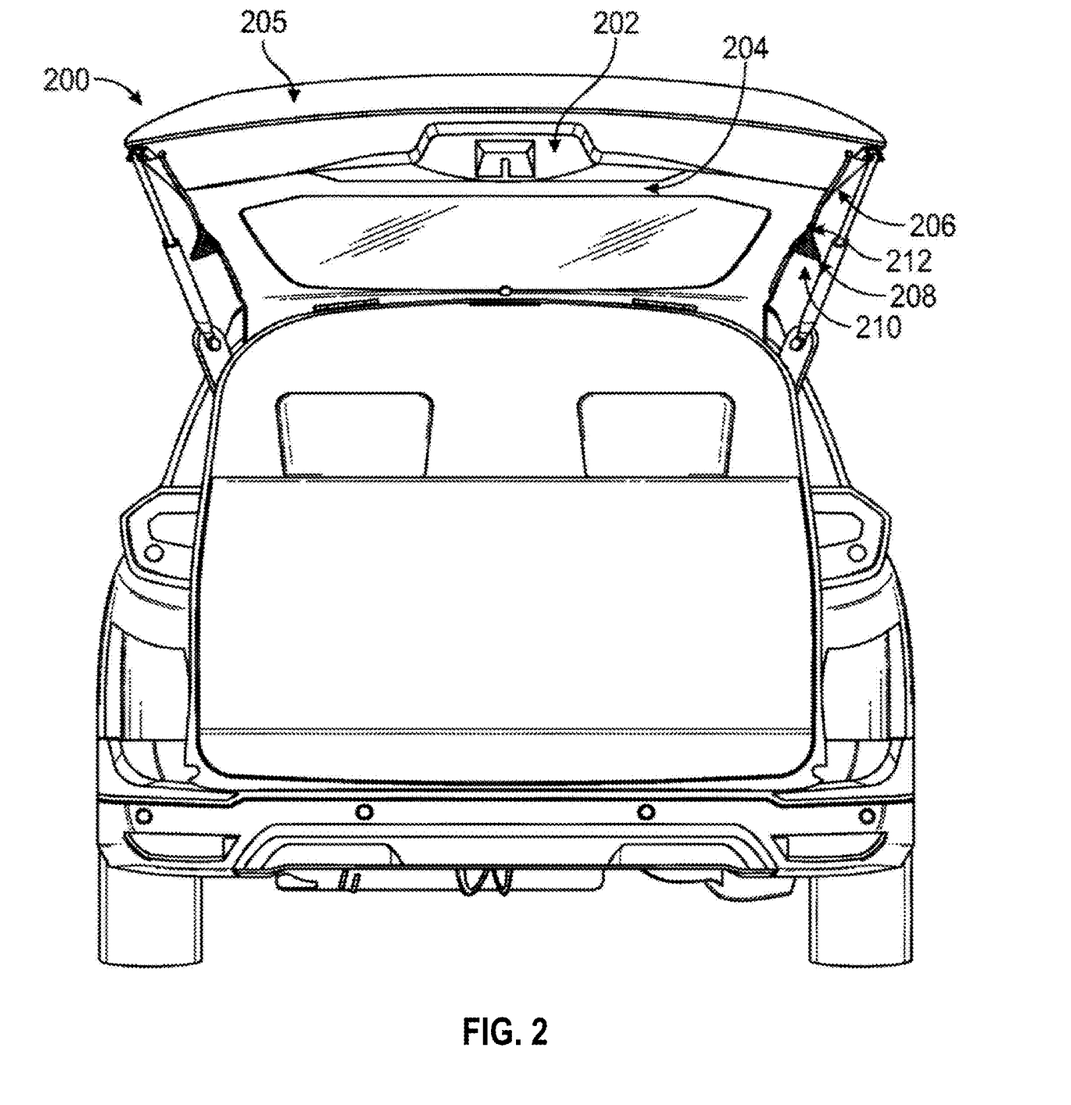
FIG. 2 is an illustration of a vehicle in accordance with an example embodiment.

FIG. 2 is an illustration of a vehicle 200 in accordance with an example embodiment. Vehicle 200 is depicted as a SUV in this illustrative example. In other example embodiments, vehicle 200 may be a van, a multipurpose vehicle, a sedan, or some other type of vehicle. Vehicle 200 has vehicle door 202, which may be an example of one implementation for structure 102 in FIG. 1. In this example embodiment, vehicle door 202 is a powered rear door that is operated by a powered system (not shown) similar to powered system 103 in FIG. 1.

Vehicle door 202 has interior side 204, exterior side 205 opposite interior side 204, and edge 206. As depicted, portion 208 of edge 206 has complex contour 210. Complex contour 210 is an example of one implementation for the complex contour of the edge of structure 102 in FIG. 1. Safety system 212 is associated with vehicle door 202. Safety system 212 is an example of one implementation for safety system 104 in FIG. 1.

As used herein, when one component is "associated" with another component, the association is a physical association. For example, a first component, such as safety system 212 or a component within safety system 212, may be considered to be associated with a second component, such as vehicle door 202 or a component of vehicle door 202, by being at least one of secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by being formed as or integrated as part of the second component.

Figure 3:
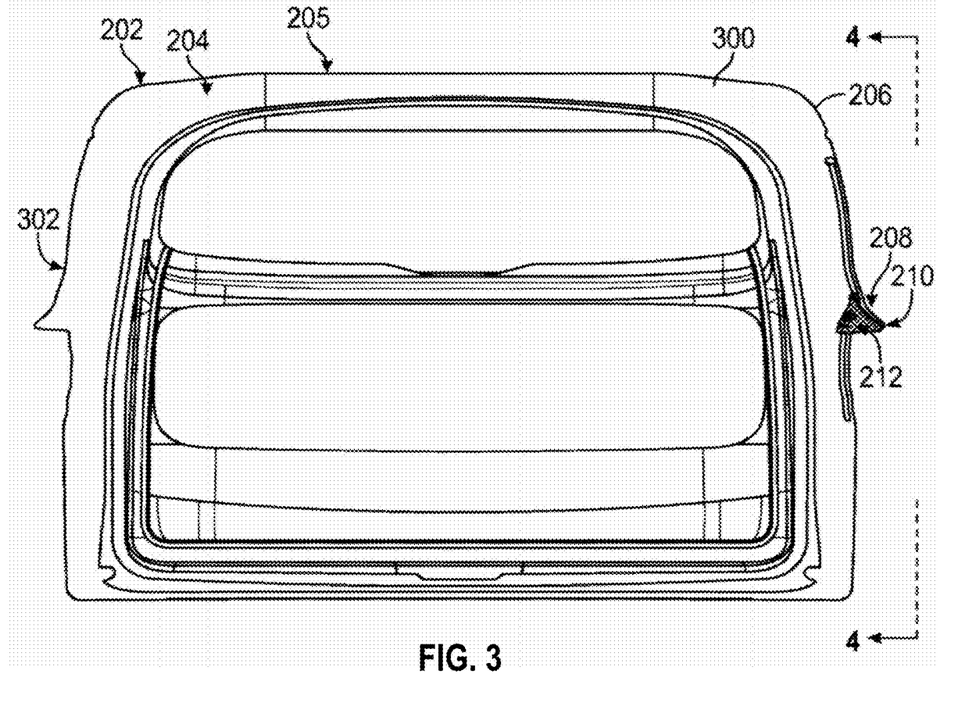
FIG. 3 is an illustration of an interior side of the vehicle door from FIG. 2 in accordance with an example embodiment

FIG. 3 is an illustration of interior side 204 of vehicle door 202 in accordance with an example embodiment. Vehicle door 202 includes door panel 300 at interior side 204. In some cases, door panel 300 takes the form of an outer door panel. Edge 206 of vehicle door 202 forms the edge of door panel 300. Vehicle door 202 further includes edge 302 opposite edge 206 in which edge 302 forms the opposite edge of door panel 300.

Complex contour 210 of portion 208 of edge 206 is more clearly seen in this figure. Complex contour 210 is a curved contour that deviates from the simpler contour of the rest of edge 206 of vehicle door 202. For example, complex contour 210 includes a curved portion with a sharper radius of curvature than the rest of edge 206.

In this example embodiment, at least one component of safety system 212 is attached to door panel 300 relative to edge 206. Although not shown in this example embodiment, at least one component of another safety system, which may be implemented in manner similar to safety system 212, may be attached to door panel 300 relative to edge 302.

Figure 4:
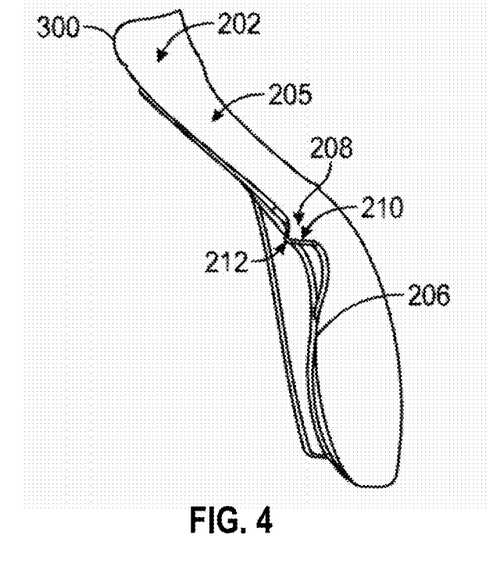
FIG. 4 is an illustration of a side view of the vehicle door from FIGS. 2-3 in accordance with an example embodiment.

FIG. 4 is an illustration of a side view of vehicle door 202 in accordance with an example embodiment. FIG. 4 provides another view of complex contour 210 of portion 208 of edge 206 taken with respect to lines 4-4 in FIG. 3.

Figure 5:
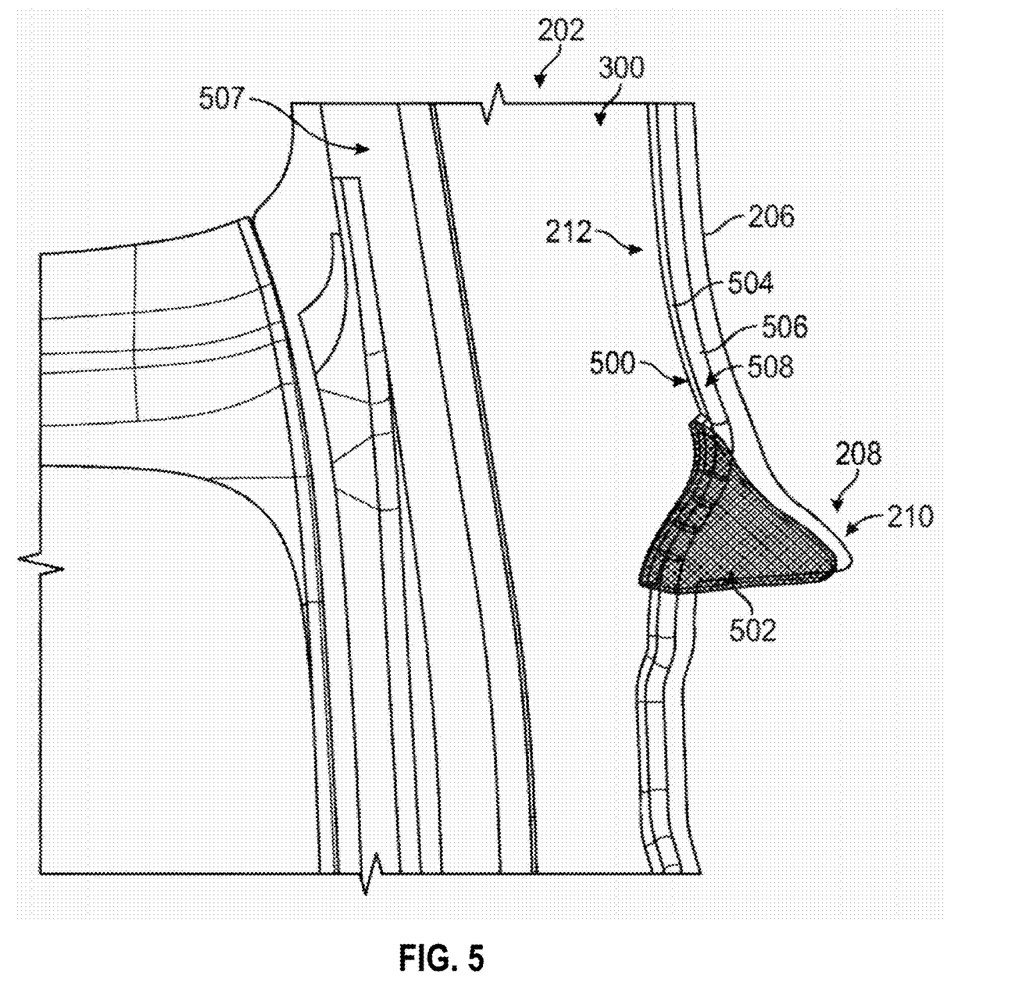
FIG. 5 is an illustration of an enlarged view of the safety system from FIGS. 2-4 in accordance with an example embodiment.

FIG. 5 is an illustration of an enlarged view of safety system 212 in accordance with an example embodiment. Safety system 212 includes sensor 500 and hinged panel device 502. Sensor 500 is an example of one implementation for the sensor of safety system 104 in FIG. 1. Hinged panel device 502 is an example of one implementation for the hinged panel device of safety system 104 in FIG. 1.

In this example embodiment, sensor 500 includes first portion 504 and second portion 506 with at least first portion 504 associated with door panel 300. For example, first portion 504 may be attached directly or indirectly to door panel 300. In other examples, first portion 504 may be associated with some other structure (e.g., inner door panel 507, a plate, a mounting plate, etc.) in a manner that allows first portion 504 to be positioned relative to door panel 300. Second portion 506 includes sensing wire 508. As depicted in FIG. 5, sensing wire 508 runs substantially aligned with edge 206 of door panel 300 except for portion 208 of edge 206 having complex contour 210. Sensing wire 508 does not need to be routed along portion 208 of edge 206 because hinged panel device 502 is used to extend the coverage of sensing wire 508 to portion 208 of edge 206. Using hinged panel device 502 eliminates the need to bend and twist sensing wire 508 to in a manner that would violate wire routing requirements, sensor specifications, or both for sensing wire 508.

Although sensor 500 is described as including first portion 504 and second portion 506, sensor 500 may only include sensing wire 508 in some example embodiments. In other example embodiments, sensor 500 may include first portion 504, second portion 506, and some other type of portion or component.

Figure 6:
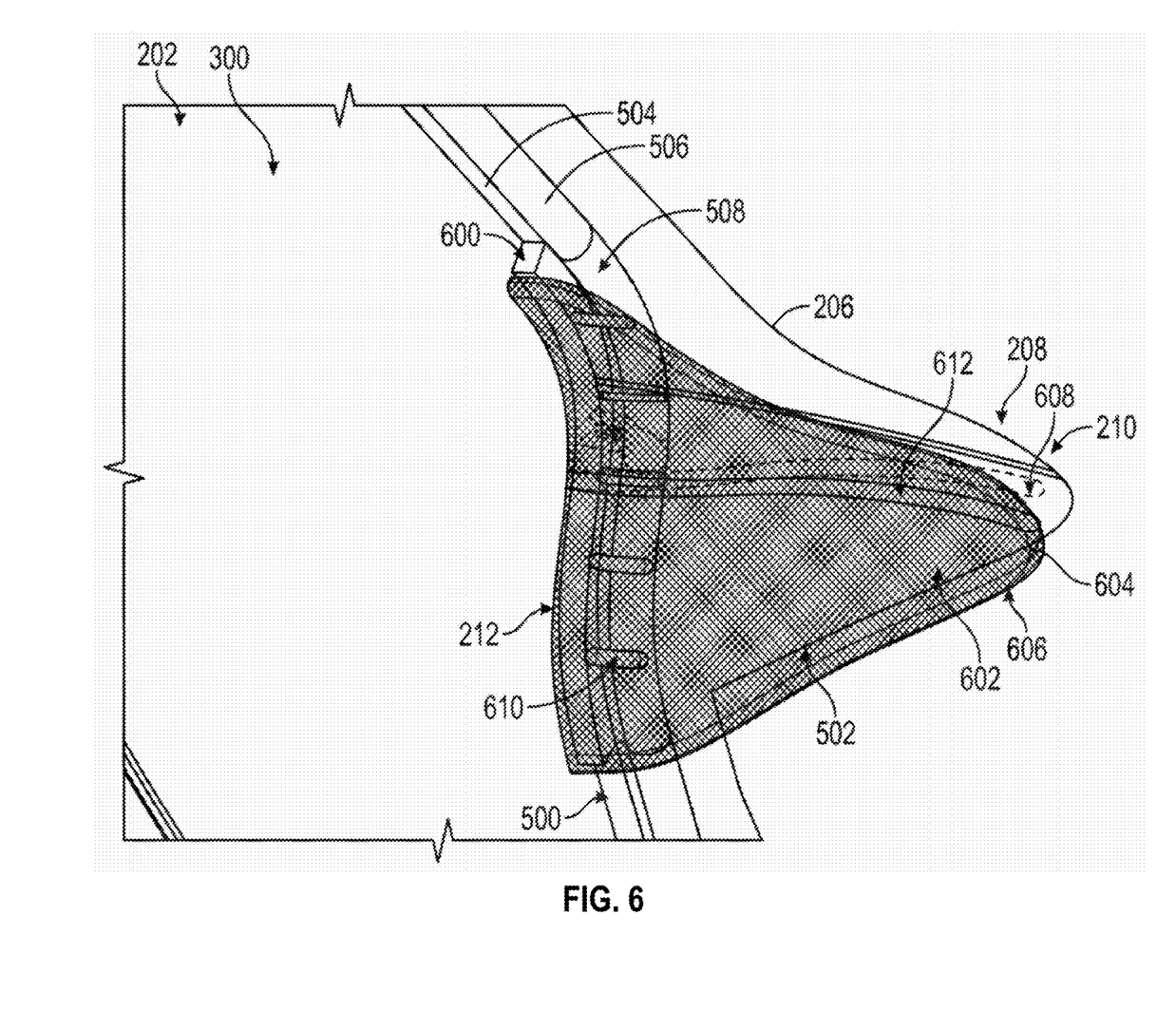
FIG. 6 is an illustration of a further enlarged view of the safety system from FIGS. 2-5, in which the view is slightly angled relative to FIG. 5 in accordance with an example embodiment.

FIG. 6 is an illustration of a further enlarged view of safety system 212 that is slightly angled relative to FIG. 5 in accordance with an example embodiment. As shown in FIG. 6, hinged panel device 502 includes hinge 600 and contoured panel 602. Hinge 600 is attached to first portion 504 of sensor 500. Hinge 600 may be, for example, comprised of a soft or compressible material that is molded to follow the contour of first portion 504 of sensor 500.

Contoured panel 602 is attached to hinge 600. In this example embodiment, contoured panel 602 is comprised of a rigid or stiff material. Contoured panel 602 has edge 604 that substantially aligns with complex contour 210 of portion 208 of edge 206. In particular, in this example embodiment, contoured panel 602 has edge 604 that has complex contour 606 that substantially conforms to complex contour 210. In other words, complex contour 606 may be the same as or nearly similar to complex contour 210.

Contoured panel 602 being attached to hinge 600 creates a space, or gap, between door panel 300 and contoured panel 602. In some example embodiments, this space, or gap, may be referred to as operating space 608 of contoured panel 602. When a first load is applied to contoured panel 602, contoured panel 602 moves relative to hinge 600. The first load may be applied to contoured panel 602 by an obstruction in contact with contoured panel 602. For example, a person's hand or finger against the contoured panel 602 applies a first load to the contoured panel. In some cases, contoured panel 602 rotates about hinge 600 in a direction towards sensing wire 508 and door panel 300. In other cases, a first load being applied to contoured panel 602 causes a compression or "squishing" of hinge 600, which enables movement of contoured panel 602 in a direction towards sensing wire 508 and door panel 300.

Movement of contoured panel 602 relative to hinge 600 causes contoured panel 602 to contact sensing wire 508 and transfer the first load to sensing wire 508 as a second load. The first load applied to contoured panel 602 results in this type of contact with sensing wire 508 and load transfer when the first load meets at least a first threshold.

In one or more example embodiments, this first threshold is a distance threshold. This distance threshold may be the minimum distance that end portion 612 of contoured panel needs to move in the direction towards door panel 300 in order for the first load to be transferred to sensing wire 508 as a second load. In some examples, the first threshold may be referred to as a gap threshold. The gap threshold is the minimum reduction of operating space 608 between contoured panel 602 and door panel 300 needed for the first load to be transferred to sensing wire 508 as a second load. In still other examples, this first threshold may be the first load needed to move end portion 612 of contoured panel 602 into contact with or within a selected distance from door panel 300. For example, the first threshold may be the first load needed to reduce operating space 608 between contoured panel 602 and door panel 300 to within selected tolerances so as to cause a transfer of the first load to sensing wire 508.

In some example embodiments, contoured panel 602 includes a plurality of members 610 associated with the surface of contoured panel 602 that faces door panel 300. Members 610 help aid contoured panel 602 in contacting and transferring loads to sensing wire 508. Members 610 may take the form of, for example, ribs attached to contoured panel 602 at various locations such that when a load is applied to contoured panel 602 that moves contoured panel 602 towards door panel 300, the ribs contact sensing wire 508 and transfer the load in a distributed manner to sensing wire 508. In other words, the ribs cause compression of sensing wire 508. Although multiple members 610 are shown in FIG. 6, in other example embodiments, a single member (or rib) may be used.

When the first load transferred to sensing wire 508 as a second load meets at least a second threshold, a "detection" results. In other words, sensing wire 508 is considered as detecting an obstruction (or a touch). The second threshold for the second load may be referred to as a strain threshold. For example, the second load must apply a sufficient strain to result in a "detection." In these examples, the strain on sensing wire 508 may need to be sufficient to cause a compression of sensing wire 508 by at least a predetermined amount. In some examples, this predetermined amount is about 2 millimeters. Thus, a compression of sensing wire 508 by at least amount 2 millimeters is considered a "detection." Accordingly, the second threshold may be sometimes referred to as a compression threshold.

A detection by sensing wire 508, as described above, triggers a response by the powered system controlling operation of vehicle door 202. For example, the powered system may respond by preventing vehicle door 202 from being fully closed, stopping movement of vehicle door 202, or causing vehicle door 202 to open fully or partially.

As one specific example, safety system 212 operates to prevent the closing of vehicle door 202 if an obstruction is in the path of vehicle door 202. As previously discussed, vehicle door 202 may be a powered rear door. During a "powered closing" (e.g., an automated closing or a manually controlled motorized closing) of vehicle door 202, the placement of a person's hand or fingers over contoured panel 602 applies a first load to contoured panel 602. This load being applied to contoured panel 602 causes movement of contoured panel 602 relative to hinge 600, which, in turn, leads to a transfer of the first load to sensing wire 508 as a second load. This second load being applied to sensing wire 508 results in a "detection" of an obstruction that triggers the powered system to prevent vehicle door 202 from further closing and potentially injuring the person. For example, the powered system may prevent vehicle door 202 from closing fully by stopping movement of vehicle door 202 in the close direction, causing vehicle door 202 to be moved in the open direction, or both.

Figure 7:
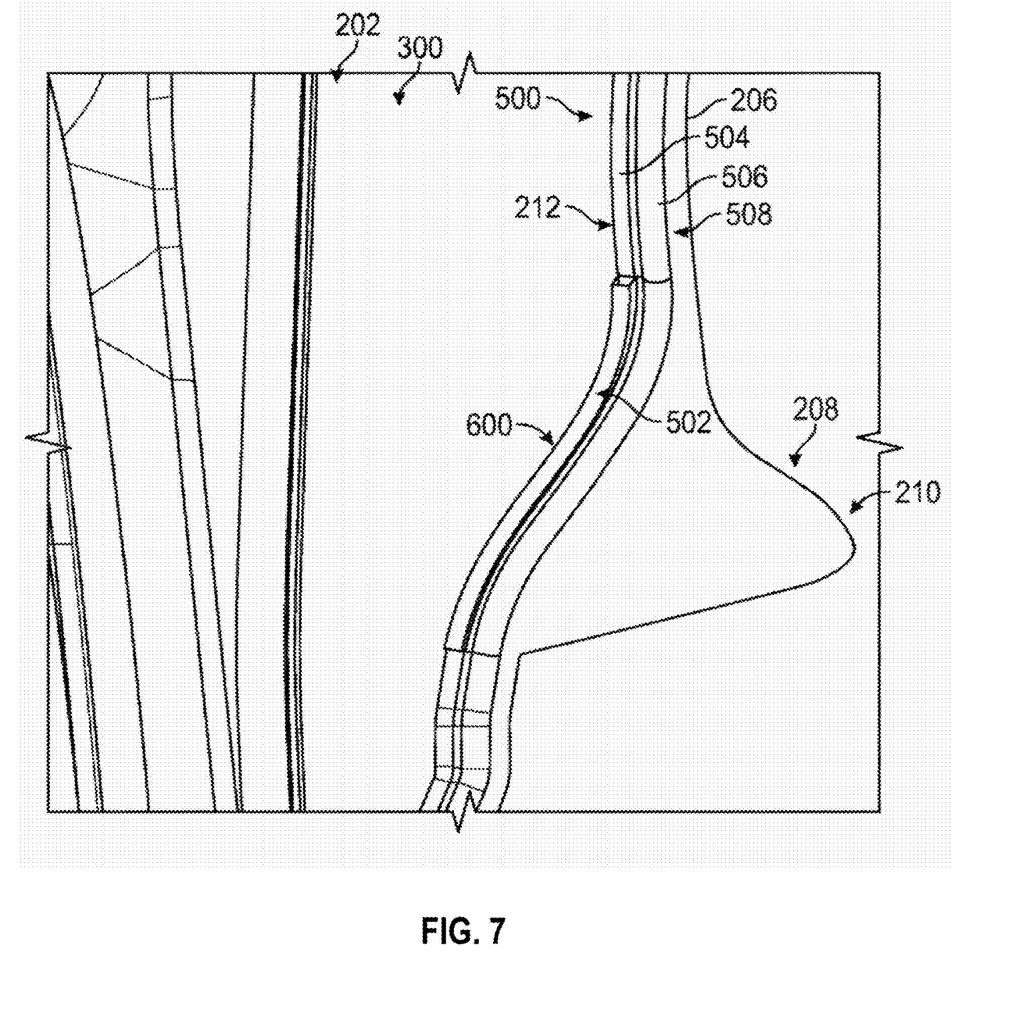
FIG. 7 is an illustration of the safety system from FIGS. 2-6 with the contoured panel removed in accordance with an example embodiment.

FIG. 7 is an illustration of safety system 212 with contoured panel 602 removed in accordance with an example embodiment. In this view, contoured panel 602 has been removed such that hinge 600 may be more clearly seen. As depicted in FIG. 7, hinge 600 is formed or molded to substantially align with or conform to first portion 504 of sensor 500 to which hinge 600 is attached. For example, hinge 600 may be comprised of a soft material that allows hinge 600 to be physically manipulated during attachment of hinge 600 to first portion 504 of sensor 500 such that hinge 600 follows the route of first portion 504.

Figure 8:
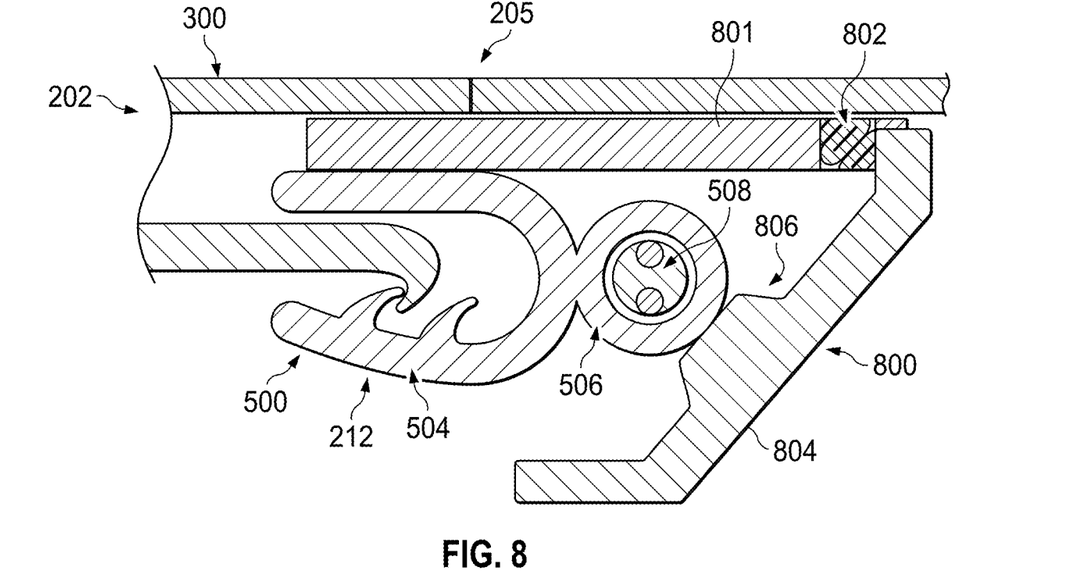
FIG. 8 is an illustration of top cross-sectional view of a different type of implementation for a hinged panel device in accordance with an example embodiment.

FIG. 8 is an illustration of top cross-sectional view of a different type of implementation for a hinged panel device in accordance with an example embodiment. In FIG. 8, first portion 504 and second portion 506 of sensor 500 are shown in cross-section. The attachment between first portion 504 of sensor 500 and door panel 300 is not shown in this view.

Hinged panel device 800 includes panel 801, hinge 802, and contoured panel 804. Panel 801 is a rigid or stiff panel that is attached to first portion 504 of sensor 500 in this example embodiment. A gap may be present between panel 801 and door panel 300. In other examples, panel 801 may be attached to first portion 504 of sensor 500 and door panel 300 or just door panel 300. Hinge 802 may be implemented similar to hinge 600 in FIG. 6 except that hinge 802 is attached panel 801 and contoured panel 804. In some cases, hinge 802 may also be connected to door panel 300. Hinge 802 joins panel 801 and contoured panel 804 together. Contoured panel 804 may be implemented in a manner similar to contoured panel 602 in FIG. 6.

Contoured panel 804 is movably attached to hinge 802. In one example embodiment, hinge 802 is comprised of a soft or compressible material such that when a load is applied to contoured panel 804, hinge 802 is compressed, thereby enabling movement of contoured panel 804 relative to hinge 802. In particular, contoured panel 804 is moved towards sensing wire 508.

Member 806 is associated with contoured panel 804. In some examples, member 806 is structurally integrated as part of contoured panel 804. In other examples, member 806 may be a separate structure attached to contoured panel 804. For example, member 806 may take the form of a rib attached to contoured panel 804. When a load is applied to contoured panel 804, contoured panel 804 moves relative to hinge 802, which causes contoured panel 804, and thereby member 806, to move towards sensing wire 508. In particular, the load applied to contoured panel 804 is transferred to sensing wire 508 through member 806.

A sufficient load being applied to sensing wire 508 results in a "detection" of an obstruction that causes safety system 212 to prevent vehicle door 202 from further closing and potentially injuring the person. For example, safety system 212 may prevent vehicle door 202 from closing fully by stopping movement of vehicle door 202 in the close direction, causing vehicle door 202 to be moved in the open direction, or both.

Member 806 may be positioned relative to sensing wire 508 of sensor 500 such that in a default position, member 806 does not contact sensing wire 508. Thus, in the default position, member 806 applies no load to sensing wire 508. In other examples, member 806 may be positioned in contact with sensing wire 508 in the default position but in a manner that does not cause a load sufficient to rise to the level of a "detection" to be applied to sensing wire 508. In other words, absent a first load that meets at least a first threshold (e.g., a distance threshold) being applied to contoured panel 804, member 806 applies no load or a second load insufficient to meet a second threshold (e.g., a strain or compression threshold) for sensing wire 508. When a sufficient first load is applied to contoured panel 804, contoured panel 804 transfers the load to sensing wire 508 as a second load via member 806. If the second load applied to sensing wire 508 meets a sufficient threshold, the sensing wire 508 is considered as "detecting" an obstruction.

The illustrations in FIGS. 2-8 are not meant to imply physical or architectural limitations to the manner in which an example embodiment may be implemented. Other components in addition to or in place of the ones illustrated may be used. Some components may be optional. The different components shown in FIGS. 2-8 may be illustrative examples of how components shown in block form in FIG. 1 can be implemented as physical structures. Additionally, some of the components in FIGS. 2-8 may be at least one of combined with, integrated with, used with, or associated with components in FIG 1.

Figure 9:
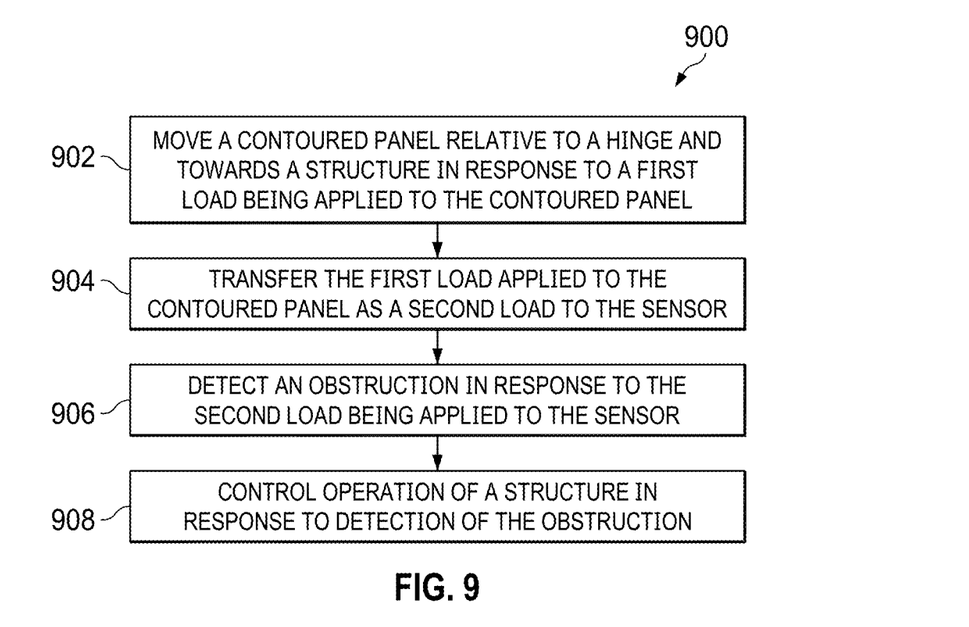
FIG. 9 is a flowchart of a method for controlling an operation of a structure in accordance with an example embodiment.

FIG. 9 is a flowchart of a method 900 for controlling an operation of a structure in accordance with an example embodiment. Method 900 is illustrated as a set of operations or steps 902 through 908 and is described with continuing reference to FIG. 1. One or more steps that are not expressly illustrated in FIG. 9 may be included before, after, in between, or as part of the steps 902 through 908. In one or more embodiments, the steps 902 through 908 may be performed to control operation of structure 102 in FIG. 1. Operation of structure 102 may be controlled by, for example, powered system 103 in FIG. 1. These steps may be implemented using safety system 104 described in FIG. 1 to control powered system 103 to thereby control operation of structure 102. In one or more embodiments, the steps 902 through 908 may be performed to prevent a vehicle door, such as vehicle door 202 in FIG. 2, from closing when an obstruction is present.

Method 900 may begin by moving a contoured panel relative to a hinge and towards a structure in response to a first load being applied to the contoured panel (step 902). In some cases, the contoured panel may be rotated about the hinge. In other examples, when the first load is applied to the contoured panel, the contoured panel causes at least a portion of the hinge to compress such that the contoured panel is considered moving relative to the hinge. Compression of the hinge by the contoured panel enables the contoured panel to be moved towards the structure. For example, when the structure is a vehicle door, the contoured panel may be moved in a direction towards the door panel on the interior side of the vehicle door.

The first load applied to the contoured panel is transferred as a second load to the sensor (step 904). In one or more example embodiments, the transfer in step 904 occurs when the first load meets at least a first threshold (e.g., a distance threshold). For example, the transfer may occur when the first load is sufficient to cause the contoured panel to move at least a minimum distance in the direction of the door panel. An obstruction is detected in response to the second load being applied to the sensor (step 906). In one or more example embodiments, the detection occurs when the second load meets at least a second threshold (e.g., a strain threshold). For example, a detection may result when the second load is sufficient to cause a sufficient strain on a sensing wire of the sensor. A sufficient strain may be one which causes the sensing wire to compress by at least about 2 millimeters.

Operation of the structure is controlled in response to detection of the obstruction (step 908). Step 908 may be performed in different ways. Controlling the operation of the structure may include, in one or more examples, controlling movement of the structure. For example, operation of the structure may be controlled by controlling operation of a powered system that operates the structure.

In one or more example embodiments, when the structure is a vehicle door, step 908 includes preventing the vehicle door from fully closing in response to detection of the obstruction. For example, the vehicle door may be in the process of being closed by the powered system when the obstruction is detected. The vehicle door is prevented from fully closing to prevent at least one of injuries or damage to the vehicle door or vehicle. The vehicle door may be prevented from fully closing by at least one of stopping (or halting) closure of the vehicle door by the powered system or causing the powered system to open (fully or partially) the vehicle door.

Thus, the different example embodiments described above provide apparatuses, systems, and methods for controlling operation of a structure, such as a vehicle door, using a sensor positioned relative to an edge of the vehicle door. A hinged panel device is used to extend coverage of the sensor to a portion of the edge of the vehicle door having a complex contour such that the sensor does not need to bend or twist to follow the complex contour of the edge. The example embodiments provide a simple and cost-effective way for extending the coverage of the sensor.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

What is claimed is:

1. An apparatus comprising:
a structure having an edge in which at least a portion of the edge of the structure has a complex contour;
a sensor attached to the structure, the sensor comprising a first portion and a second portion, the second portion comprising a sensing wire;
a hinge directly coupled to at least the first portion of the sensor, wherein the hinge conforms to at least the first portion of the sensor;
a contoured panel attached to the hinge in which the contoured panel has a first edge and a second edge,
wherein the first edge of the contoured panel comprises a length extending between opposing first and second ends of the first edge;
wherein the length of the first edge extends along the hinge;
wherein the second edge extends from the first end and the second end of the first edge;
wherein the second edge substantially aligns with the complex contour of the edge of the structure such that the second edge follows the complex contour of the edge of the structure; and
a member attached to a surface of the contoured panel,
wherein the member is adjacent to the hinge;
wherein the surface faces the structure;
wherein the member is in contact with the sensing wire when a first load is applied to the contoured panel.

2. The apparatus of claim 1, wherein the contoured panel is attached to the hinge such that application of the first load to the contoured panel causes the contoured panel to move relative to a portion of the hinge and to transfer, via the member, the first load to the sensing wire as a second load.

3. The apparatus of claim 2, wherein:
a distance threshold is a minimum distance that an end portion of the contoured panel needs to move for the first load to be transferred to the sensing wire as the second load; and
wherein an obstruction is detected when the second load applied to the sensing wire meets at least a strain threshold.

4. The apparatus of claim 3, further comprising:
a powered system, wherein operation of the powered system is controlled based on detection of the obstruction.

5. The apparatus of claim 3, wherein the distance threshold and the strain threshold are different.

6. The apparatus of claim 1, wherein the sensing wire detects an obstruction when a movement of the contoured panel relative to a portion of the hinge causes the member to compress the sensing wire by a predetermined amount.

7. The apparatus of claim 1, wherein the hinge comprises a compressible material, and wherein movement of the contoured panel relative to a first portion of the hinge causes compression of at least a second portion of the hinge.

8. The apparatus of claim 1, wherein the complex contour of the edge is a curved contour that deviates from a simpler contour of a rest of the edge of the structure, the simpler contour being simpler than the curved contour.

9. The apparatus of claim 1,
wherein, in a default position absent the first load, the member is in contact with the sensing wire and applies a second load to the sensing wire that is less than a threshold;
wherein applying the first load to the contoured panel increases the second load applied to the sensing wire; and
wherein, when the second load is increased such that the second load meets the threshold, an obstruction is detected by the sensing wire.

10. The apparatus of claim 1, wherein the structure is a vehicle door selected from any one of: a powered rear door, a powered sliding door, a powered side door, or a tailgate door.

11. A vehicle door comprising:
a door panel having an edge in which at least a portion of the edge of the door panel has a complex contour;
a sensor attached to the door panel in which the sensor comprises a sensing wire that runs substantially aligned with the edge of the door panel except for the portion of the edge of the door panel having the complex contour;
a hinge directly coupled to at least a portion of the sensor, wherein the hinge conforms to at least the portion of the sensor;
a contoured panel attached to the hinge in which the contoured panel has a first edge that substantially aligns with the complex contour of the edge of the door panel such that the first edge of the contoured panel follows the complex contour of the edge of the door panel;
wherein the contoured panel further comprises a second edge;
wherein the second edge of the contoured panel comprises a length extending between opposing first and second ends of the second edge;
wherein the length of the second edge extends along the hinge;
wherein the first edge of the contoured panel extends from the first end and the second end of the second edge of the contoured panel such that a first portion of the first edge extends away from the first end of the second edge and a second portion of the first edge extends away from the second end of the second edge;
at least one member attached to a surface of the contoured panel,
wherein the at least one member is adjacent to the hinge;
wherein the surface faces the door panel;
wherein the at least one member is in contact with the sensing wire when a first load is applied to the contoured panel; and
wherein, when the first load is applied to the contoured panel and meets at least a threshold, the at least one member attached to the contoured panel transfers the first load to the sensing wire as a second load, which thereby results in a detection of an obstruction.

12. The vehicle door of claim 11, further comprising:
a powered system that controls an opening operation and a closing operation of the door panel; and
a safety system that includes the sensor, the hinge, and the contoured panel, wherein the safety system controls the closing operation or the opening operation of the powered system in response to the detection of the obstruction by the sensor.

13. The vehicle door of claim 12, wherein the safety system prevents the powered system from completing the closing operation of the door panel in response to the detection of the obstruction by at least one of stopping the closing operation of the door panel or causing the powered system to start the opening operation of the door panel.

14. A vehicle door comprising:
   a door panel having an edge in which at least a portion of the edge has a complex contour;
   a sensor comprising a sensing wire running substantially aligned with the edge of the door panel except for the portion of the edge having the complex contour;
   a hinge that is directly coupled to and conforms to at least a portion the sensor; and
   a contoured panel having a first edge and a second edge,
      wherein the first edge of the contoured panel is attached to the hinge;
      wherein the first edge of the contoured panel comprises a length extending between opposing first and second ends of the first edge;
      wherein the length of the first edge extends along the hinge;
      wherein the second edge extends from the first end and the second end of the first edge such that a first portion of the second edge of the contoured panel extends away from the first end of the first edge of the contoured panel and a second portion of the second edge of the contoured panel extends away from the second end of the first edge of the contoured panel and thereby, the hinge and the sensing wire, and such that the second edge of the contoured panel is positioned away from the sensing wire; and
   wherein the second edge of the contoured panel is substantially aligned with and follows the complex contour of the edge of the door panel.

15. The vehicle door of claim 14, further comprising:
   a plurality of members attached to a surface of the contoured panel between the first edge and the second edge of the contoured panel,
   wherein the surface faces the door panel;
   wherein the plurality of members are adjacent to the hinge;
   wherein at least a portion of the plurality of members attached to the surface of the contoured panel is in contact with the sensing wire when a first load is applied to the contoured panel.

* * * * *